(12) United States Patent
Pinsky et al.

(10) Patent No.: US 6,920,337 B2
(45) Date of Patent: Jul. 19, 2005

(54) APPARATUS, SYSTEM, AND METHOD FOR WIRELESS NOTIFICATIONS

(75) Inventors: Maria Pinsky, Colorado Springs, CO (US); Jessica Kraemer, Monument, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 496 days.

(21) Appl. No.: 10/085,114

(22) Filed: Mar. 1, 2002

(65) Prior Publication Data

US 2004/0204044 A1 Oct. 14, 2004

(51) Int. Cl.[7] ................................................. H04B 1/38
(52) U.S. Cl. .................... 455/556.1; 455/557; 455/458; 455/466; 455/550.1
(58) Field of Search ............................. 455/556.1, 557, 455/458, 466, 550.1, 412.1–412.2, 113, 418, 459

(56) References Cited

U.S. PATENT DOCUMENTS

| | | | | |
|---|---|---|---|---|
| 4,731,814 A | * | 3/1988 | Becker et al. ............... 455/411 |
| 5,944,786 A | * | 8/1999 | Quinn ......................... 709/206 |
| 6,038,542 A | * | 3/2000 | Ruckdashel .................... 705/9 |
| 6,212,396 B1 | * | 4/2001 | Brown et al. ................ 455/464 |
| 6,255,800 B1 | * | 7/2001 | Bork ........................... 455/557 |
| 6,263,218 B1 | * | 7/2001 | Kita ............................ 455/567 |
| 6,446,118 B1 | * | 9/2002 | Gottlieb ...................... 709/217 |
| 6,668,178 B1 | * | 12/2003 | Ramaswamy et al. ....... 455/572 |
| 2002/0132639 A1 | * | 9/2002 | Sato ............................ 455/556 |

* cited by examiner

Primary Examiner—CongVan Tran (57) ABSTRACT

A wireless notification apparatus, system and method provide notifications to a user relating to e-mails, voice messages, meeting and calendar reminders, or any combination thereof, when the user is away from the user's desk, computer, workstation, or the like. The notification system may include a notification device and a base station. The notification device may have a microprocessor, a display for displaying data, and a wireless receiver for receiving wireless data, the microprocessor coupled with the display and the wireless receiver. The base station may include a wireless transmitter for transmitting data to the wireless receiver when an event has occurred at the user's desk. In this manner, the wireless notification system provides time sensitive data—such as meeting reminders, calendar reminders, voice message information, or email information—to the intended recipient even when the intended recipient is away from his or her desk.

22 Claims, 5 Drawing Sheets

CALL: 303-555-1212
FROM: JOHN SMITH
TIME: 9:15 AM TUES

FIG.5A

VMSG: 303-555-1212
FROM: JOHN SMITH
TIME: 9:20 AM TUES

FIG.5B

REMINDER: PAY BILLS
DUE: 5:00 PM TUES

FIG.5C

MTG: 10:30 AM TUES
RE: PRESS RELEASE
WHERE: CONF RM A

FIG.5D

EMAIL: JOHN SMITH
RE: PRESS RELEASE
SENT: 8:48 AM TUES

APPARATUS, SYSTEM, AND METHOD FOR WIRELESS NOTIFICATIONS

TECHNICAL FIELD

This invention relates, in general, to a wireless notification system

BACKGROUND

In today's working environment, there are many different systems which can be used to communicate with an individual. Such systems may include an e-mail system to transmit e-mails to an individual, a telephone system to establish a telephone call with an individual, a voicemail system to provide voice messages to an individual, and various other computer based systems for providing an individual with reminders of meetings or other calendared events. These systems are generally locationally dependent in that they typically require the intended recipient of the information to be located at the individual's desk, computer area, workstation, work area or the like, for instance, in an office environment. When an individual leaves this area, the e-mails, voicemails, and meeting and calendar reminders may accumulate, and time sensitive notifications or reminders may not be received by the intended recipient until after a deadline or reminder time has passed.

As recognized by the present inventors, what is needed is a system which provides notifications to a user relating to e-mails, voice messages, meeting and/or calendar reminders, or any combination thereof, when the user is away from the user's desk, work area, computer area, workstation, or the like.

It is against this background that various embodiments of the present invention were developed.

SUMMARY

In light of the above and according to one broad aspect of one embodiment of the invention, disclosed herein is a wireless notification system which provides notifications to a user relating to e-mails, voice messages, meeting and/or calendar reminders, or any combination thereof, when the user is away from the user's desk, computer area, work area, or workstation or the like. In this manner, time-sensitive data may be provided to the intended recipient even when the intended recipient is away from these areas.

In another embodiment, disclosed herein is an apparatus for notifying a user of an occurrence of one or more events relating to the user's computer. In one embodiment, the apparatus includes a body, a wireless receiver for receiving a wireless message containing a notification corresponding to the occurrence of an event which occurred at the user's computer, a microprocessor positioned within the body for processing the notification, and a display positioned on the body for displaying information relating to the notification. The event may include, for example, a receipt of a meeting reminder at the computer, a receipt of a calendar reminder at the computer, or a receipt of an e-mail message at the computer. The apparatus may also have a memory having a portion configured as a queue for storing multiple notifications, and at least one user selectable button coupled with the microprocessor for controlling the display of the information relating to the notification. The apparatus may be embodied as a pen, pencil, or integrated with a device or utensil which a user may use in a work, office, or computing or telephonic environment or situation, such as a pen, pencil, pointer, or other implement, device, or article.

In another embodiment, disclosed herein is a method for notifying a user of an occurrence of an event relating to the user's computer. A notification device is provided including a microprocessor, a display for displaying data, and a wireless receiver for receiving data. An event occurring at the user's computer—such as a receipt of a meeting reminder, a calendar reminder, or an e-mail message—is detected, and a notification corresponding to the event is transmitted to the notification device. The notification is received at the notification device, and information relating to the notification is displayed on the notification device.

A base station may be provided having, in one embodiment, a cradle for receiving the notification device. If the notification device is positioned within the cradle, then the detecting operation is disabled until a time when the notification device is removed from the cradle.

The foregoing and other features, utilities and advantages of various embodiments of the invention will be apparent from the following more particular description of various embodiments of the invention as illustrated in the accompanying drawings and claims.

DETAILED DESCRIPTION

In accordance with various embodiments of the present invention, disclosed herein is a wireless notification system which provides a user with notifications of events. In one embodiment, the wireless notification system includes a wireless notification device 12, one example shown in FIG. 3, and a base station 14, one example shown in FIG. 2. The wireless notification device may be embodied as or integrated with a device or utensil which a user may use in a work, office, or computing or telephonic environment or situation, such as a pen, pencil, pointer, or other implement, device, or article. While a wireless notification device is shown in the examples of FIGS. 1, 2, 4, 6, and 7 as a writing instrument such as a pen, it is understood that the wireless notification device could be embodied as other devices, articles, or utensils.

Figure 1:
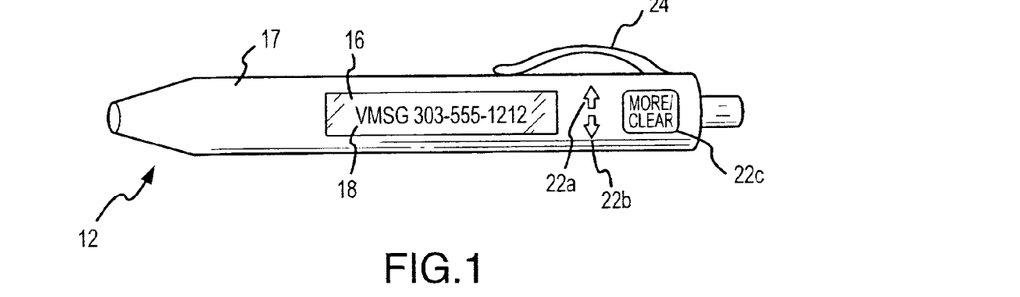
FIG. 1 illustrates a wireless notification system including a wireless notification device having a display and buttons for controlling the display, in accordance with an embodiment of the present invention.

In general, the notification device 12 of FIG. 1 is provided with information from a base station 14 which provides the user with notifications of events that have occurred at the user's desk, for instance, while the user was not at the user's desk. For example, the wireless notification device 12 could inform the user of the receipt of e-mails, the receipt of phone calls, the receipt of voice messages, and meeting or calendar reminders, or any combination thereof. As used herein, the term user's "desk" includes the locations where the user's computer and/or telephone are located, such as a desk, computer area, workstation, work area, or otherwise.

As shown in FIG. 1, the wireless notification device 12 may include a display 16 for displaying notifications to the user. In one embodiment, the display 16 is an LCD display positioned on the body 17 of the notification device 12 across a portion of the length of the notification device 12. In one embodiment, the body 17 is generally elongated and cylindrically shaped having a first end and a second end, although other body shapes may be used. Text or other message information 18 is displayed on the display 16, and in one example can scroll across or up or down on the display 16. If the user receives a phone call, then a notification of the phone call can appear in the display 16 of the notification device 12 with the details of the call. Upon receiving a new e-mail, the user of the notification device 12 can receive a notification on the display 16 of the notification device 12. If a reminder for an appointment or meeting, for example, pops up at the user's workstation, then the wireless notification device 12 can display such information for the user. In this manner, the notification device 12 provides a discrete way of receiving information about what is going on at the user's desk if the user is unable to be at the desk, in one example.

The notification device 12 may also be equipped with an audible or vibratory indicator 20, in order to provide the user with an indication that new information has been received by the wireless notification device 12, or that a pending message or reminder needs attention.

The notification device 12 may also include a set of buttons or a keypad 22. In the example in FIG. 1, a scroll up and scroll down button 22a,b, as well as a "clear" button 22c, are shown. The scroll up or down button(s) 22a,b provide(s) the user with the ability to scroll through a queue of messages or notifications that are maintained in a memory 23 (FIG. 3) of the notification device 12, while the clear button provides a means for the user to delete a notification, or delete the entire queue of notifications, as desired.

Figure 7:
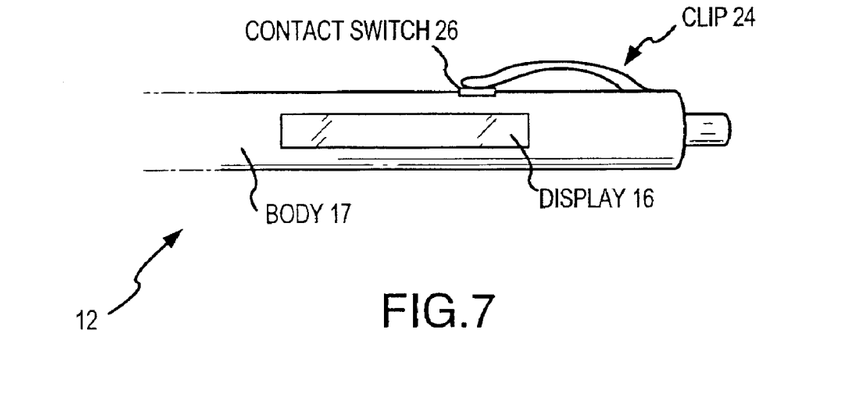
FIG. 7 illustrates a wireless notification device having a contact switch in communications with a clip of the wireless notification device, the contact switch and clip controlling the display of the wireless notification device, in accordance with an embodiment of the present invention.

The clip 24 shown in the example of FIG. 1 can be a conventional pen clip, or alternatively, as shown in FIG. 7, the clip 24 can activate a contact switch 26 positioned under the free end of the clip, wherein the contact switch 26 provides the user control of the display contents. For example, in the embodiment shown in FIG. 7, the clip 24 and contact switch 26 may provide the user with a means to cycle through the notifications or messages in the queue. For instance, upon the depression of the free end of the clip 24 onto the contact switch 26, the information displayed in the display 16 of the notification device 12 could move to the next item to be displayed. In another example, if the user presses down on the free end of the clip 24 to activate the contact switch 26 for an extended period of time (i.e., three seconds) then the queue of notifications in the notification device 12 could be cleared, if desired.

Figure 2:
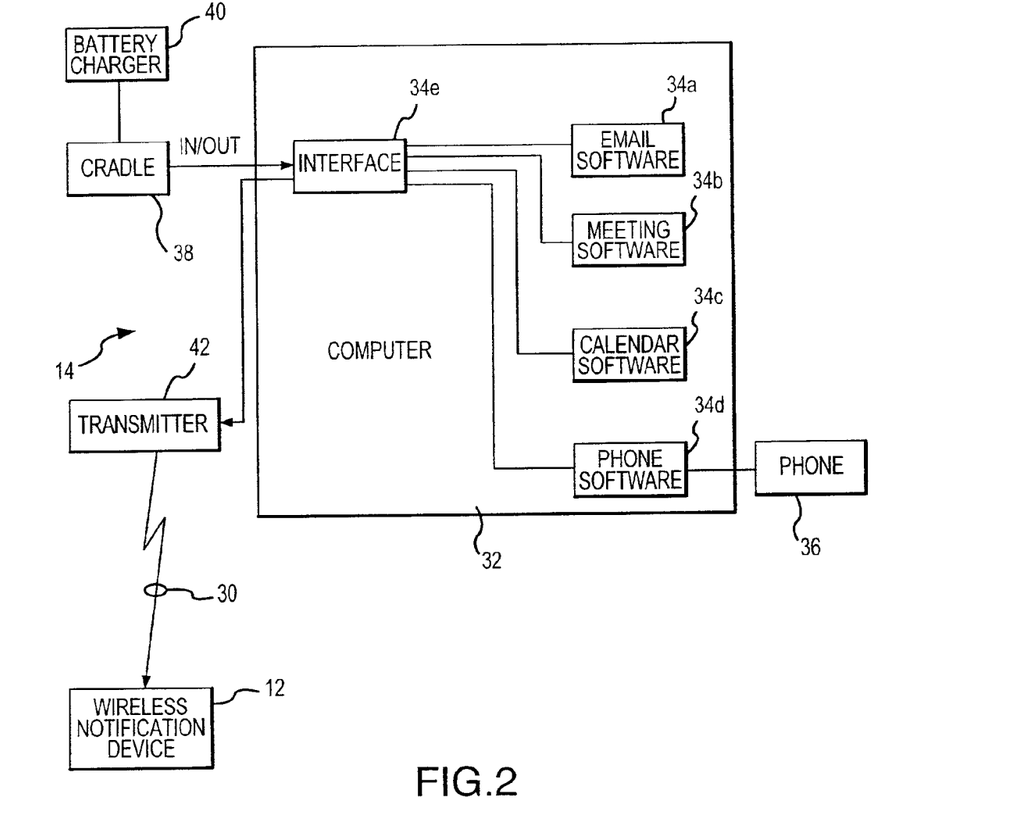
FIG. 2 illustrates a block diagram of a base station for communicating with a wireless notification device, in accordance with an embodiment of the present invention.

Referring now to FIG. 2, one embodiment of a wireless notification system is shown, including a notification device 12 having a wireless communication link 30 with a base station 14. As shown in the embodiment of FIG. 2, the base station 14 may include a cradle 38, a battery charger 40, and a wireless transmitter 42 for transmitting the notifications over the wireless link 30 to the notification device 12. The base station may be coupled with or integrated in a computer 32 with a plurality of software modules 34a–e so that the base station can receive data from the computer relating the events occurring in the computer. The base station may also receive data from a phone 36.

The computer 32 of FIG. 2 may have various software modules 34a–e therein, including a notification device interface software module 34e. The notification device interface software module 34e is responsible for receiving a signal from the cradle 38 indicating whether the notification device 12 is in or out of the cradle 38. In one embodiment, if the notification device 12 is in the cradle 38, then the wireless notification system is placed in an idle mode, wherein notifications of events that are occurring at the computer 32 and/or telephone 36 are not reported to the wireless notification device 12. In this manner, the queue of notifications maintained by the wireless notification device 12 is not filled with information that the user is already aware of, such as e-mails or telephone calls which occur while the user is at his or her desk.

Further, the notification device interface software module 34e may receive data from a plurality of other software modules in the computer 32, depending upon the types of notifications which the user desires to receive. In one embodiment, the notification device interface software module 34e receives or monitors the e-mails which are received by the e-mail software 34a (such as Microsoft's OUTLOOK (™)) of the computer 32. In this manner, when an e-mail is received by the computer, the notification device interface software module 34e can generate a notification to the wireless notification device 12 of information relating to the e-mail, such as the senders name, the time the e-mail was sent, and the subject line of the e-mail, in one embodiment. Further, in another embodiment, the notification device interface software module 34e receives notifications which are generated by a meeting software module 34b and/or a calendar software module 34c—such as Microsoft's OUTLOOK(™). In this manner, the notification device interface software module 34e can generate reminder notifications to the wireless notification device 12 of meetings or other calendar reminders that are generated by the meeting software module 34b or the calendar software module 34c.

Further, the notification device interface software module 34e may be adapted to receive data from a phone software module 34d, wherein the data may include caller ID information such as the time a call was received, the phone number of the caller, as well as the identification (i.e., name) of the caller. Further, the notification device interface software module 34e may also receive voicemail data from the phone software 34d, including the time and date of a voicemail message, as well as the caller's identification. This information can be used by the notification device interface software module 34e to generate a notification to the notification device 12.

The notification device interface software module 34e may also be in communications with a wireless transmitter 42, so that when the notification device interface software module 34e has received data relating to an event of which the wireless notification device 12 is to be notified of, the notification device interface software module 34e formulates a message to be sent via the wireless transmitter 42 to the wireless notification device 12.

Figure 3:
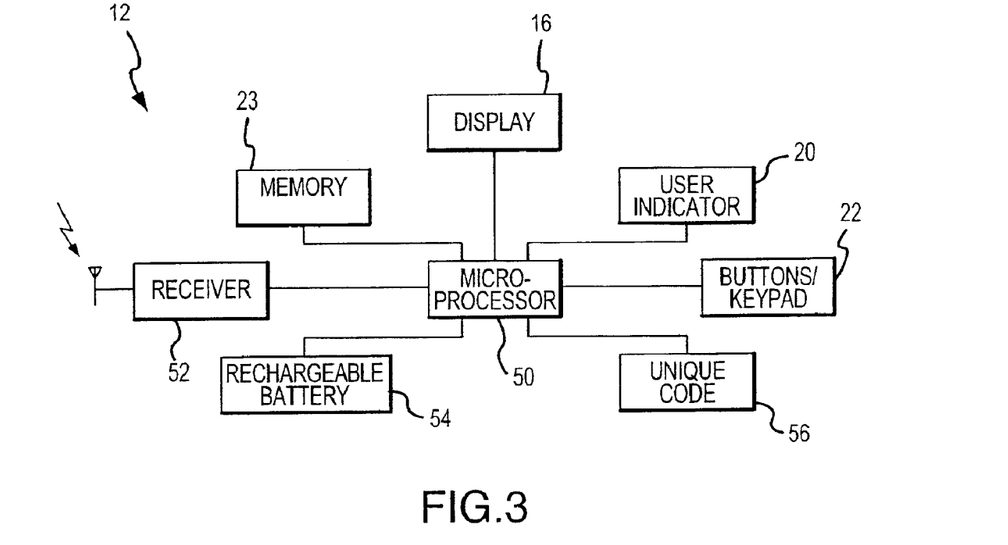
FIG. 3 illustrates a block diagram of a wireless notification device, in accordance with an embodiment of the present invention.

FIG. 3 illustrates a block diagram of a wireless notification device 12, in accordance with one embodiment of the present invention. As shown in FIG. 3, the wireless notification device 12 may include a microprocessor or other programmable logic device 50 coupled with a display 16 and other user indicators 20. The display 16 can be an LCD display capable of displaying alphanumeric text or other indicators, and the user indicators 20 may include lights, vibrational indicators, audible indicators, or any other form of indicators which a user of the wireless notification device 12 can perceive. The buttons and/or keypad 22 are inputs to the microprocessor 50, and the microprocessor 50 receives and detects keypad or button 22 depressions by the user and takes appropriate action upon such depressions. The wireless notification device 12 is further provided with a memory 23, which may be persistent, in which to maintain a queue of notifications received. In one example, the memory 23 of the wireless notification device 12 is of sufficient size to provide the wireless notification device 12 with a buffer of 256 notifications, and further, the queue or buffer of notifications may be a "first in, first out" buffer which the user can cycle through using the buttons or keypad 22, in one embodiment. Other buffer sizes and management techniques may be utilized as needed for particular applications.

A wireless receiver 52 is provided in the wireless notification device 12 so that the wireless notification device 12 can receive the data transmitted by the base station 14. The receiver 52 provides this received data to the microprocessor 50 for processing therein. A battery 54, rechargeable in one example, is also provided on the wireless notification device 12, and the battery 54, in one embodiment, provides power to the wireless notification device 12, including to the receiver 52, microprocessor 50, memory 23, display 16, and any other circuitry which requires power. In one embodiment, the microprocessor 50, battery 54, receiver 52, and memory 23 are located within the body 17 of the notification device 12.

As shown in FIG. 3, the wireless notification device 12 may be provided with a unique code 56 which uniquely identifies the wireless notification device 12. In one embodiment, the unique code 56 may be a serial number embedded in the software of the microprocessor 50, or a unique code stored in a non-volatile memory in the wireless notification device 12. Or the unique code 56 may be passed from the base station 14 to the wireless notification device 12.

The unique code 56 is used such that upon insertion of the wireless notification device 12 into the cradle 38 of the base station 14, the base station 14 reads the unique code 56 from the wireless notification device 12 and then transmits this unique code as a header of wireless messages transmitted to the wireless notification device 12. In this manner, multiple wireless notification devices and systems can be used in an office space and each wireless notification device will receive and decode only messages which are intended for that particular notification device.

Figure 4:
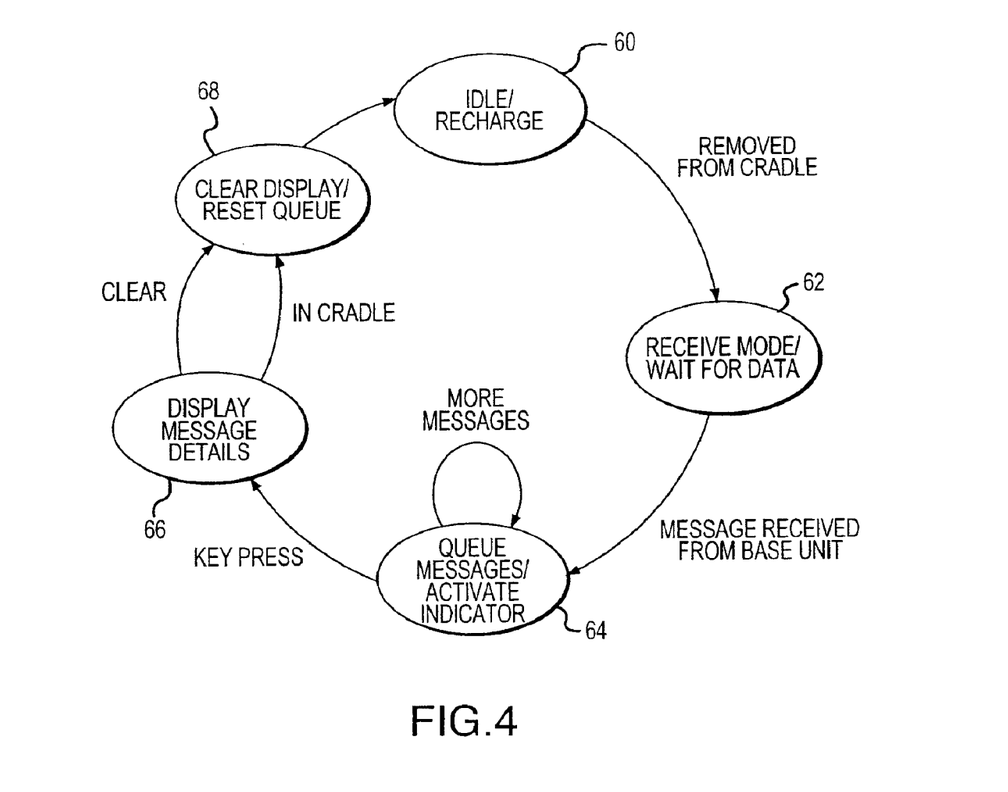
FIG. 4 illustrates a state diagram of various modes of operation of a wireless notification device, in accordance with an embodiment of the present invention.

Now referring to FIG. 4, a state diagram is shown with various states of one example of a wireless notification device 12 and how these states or modes are cycled through depending upon various events occurring. In one embodiment, initially at startup, the wireless notification device 12 is in an "idle or recharge" state 60 when the notification device 12 is in the cradle 38. In this state 60, the base station 14 may read the unique code 56 of the wireless notification device 12 and use this unique code as a header to transmit subsequent notifications to the wireless notification device 12.

When the notification device 12 is removed from the cradle 38, then the notification device enters a "receive" mode or state 62 in one example wherein the notification device 12 waits for data to be transmitted by the base station 14 to the wireless notification device 12. When a message is received from the base unit 14, the notification device 12 in one example enters a "queuing" mode 64 wherein the notification device 12 receives and stores the message or messages received from the base unit 14. In this state 64, the wireless notification device 12 can activate an indicator 20 or display some data on the display 16 indicating to the user that one or more messages or notifications have been received from the base unit 14. Furthermore, in one embodiment, as additional messages are received, they are queued by the wireless notification device 12 and stored in memory 23. Further, as indicated above, the indicator 20 to the user which indicates that a message or messages are present can take the form of a graphical display 16, the illumination of a light or LED, an audible signal, a vibration, or any other indication which can be perceived by the user.

If messages have been received and queued by the wireless notification device 12, then when the user presses a key 22 on the notification device 12, such as the scroll up key 22a or scroll down key 22b, then the "display message detail" state 66 of FIG. 4 is entered, in one embodiment. In this state 66, the details of a message can be displayed to the user if desired. For instance, as the user scrolls up or down through the messages in the queue, if the user then presses the "more" button 22c, then more details about the particular message can be displayed on the display screen 16 of the wireless notification device 12. In one embodiment, each notification message provided to the user has multiple screens of data (i.e., see FIG. 5A; for instance, a call notification can include a screen to shown the telephone number, a screen to show the caller's name, and a screen to show the time and date of the call). In one embodiment, the messages in the queue are displayed hierarchically such that a user can delineate whether the notification is a notification of a telephone call, a voice message, a calendar reminder, a meeting reminder, or a receipt of an e-mail, or any combination thereof. If more messages are received by the notification device 12, then the messages are queued.

If the user places the notification device 12 in the cradle 38 (or, in one example, the user presses the clear button 22c to clear all the messages in the message queue), the "clear/reset" state 68 is entered wherein the queue is cleared and the display 16 is also cleared, in one embodiment. The wireless notification device 12 can then enter the idle/recharge state 60 shown in FIG. 4. In this manner, the wireless notification device 12 is in an active mode of receiving and storing/queuing messages when the notification device 12 has been removed from the cradle 38 by the user, and once the notification device 12 is placed in the cradle 38, the wireless notification device 12 enters the idle/recharge state 60.

Figure 5A:
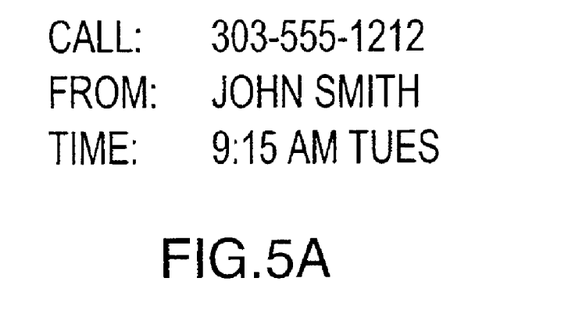
FIGS. 5A–5E illustrate various sample display screens for a wireless notification device, in accordance with an embodiment of the present invention.
Figure 5B:
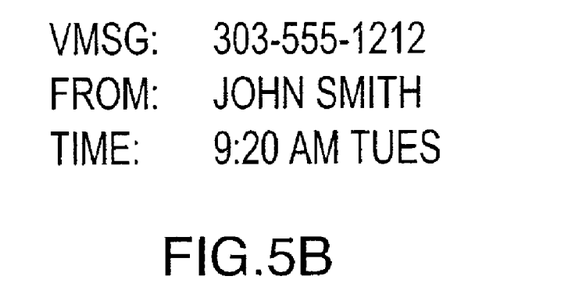
Figure 5C:
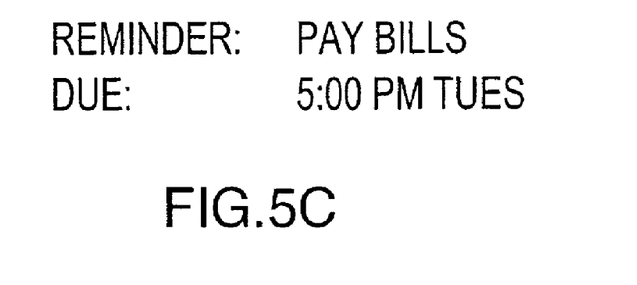

FIGS. 5A–5E illustrate various examples of display screens for a wireless notification device 12. It is understood that the display screens shown in FIGS. 5A–5E are by way of example only, and the content of any particular display is a matter of choice depending upon the particular implementation. Referring to FIG. 5A, various data elements of a telephone call notification are illustrated, including the telephone number of the caller, the name of the caller, and the time and date of the call, in one embodiment. In FIG. 5B, various data elements of a voice message notification are illustrated, and include in one embodiment the telephone number of the caller, the name of the caller, and the time and data of the voice message. In FIG. 5C, various data elements of a reminder notification are illustrated, and in one embodiment include the title of the reminder, as well as the due dates and time of the reminder.

Figure 5D:
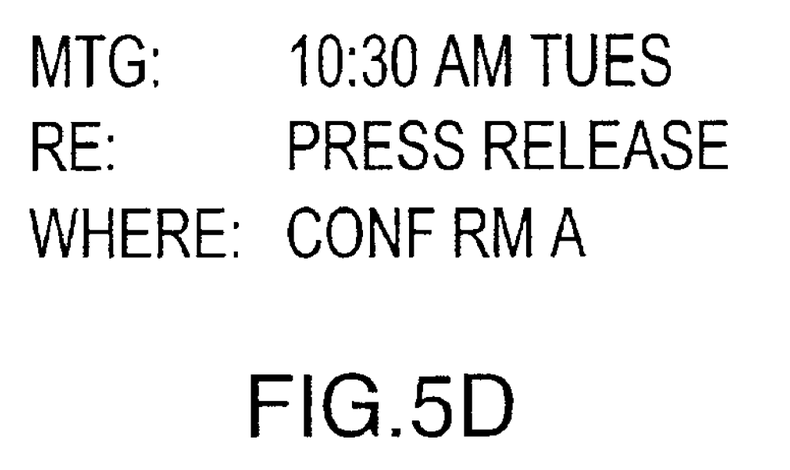
Figure 5E:
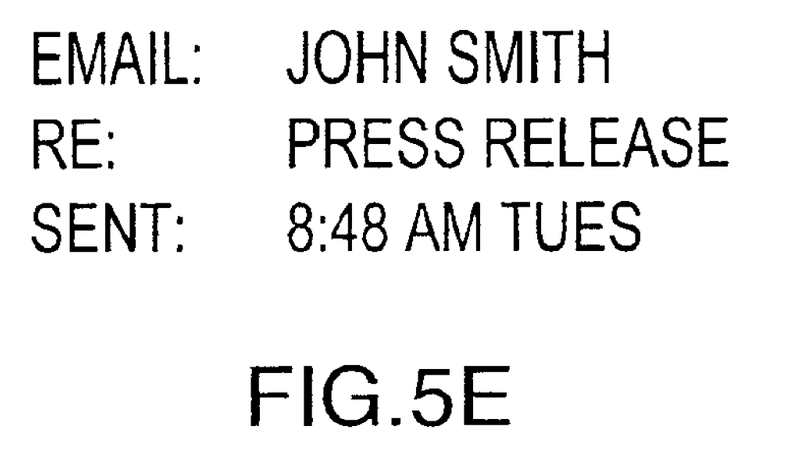

In FIG. 5D, various data elements of a meeting reminder notification are illustrated, and in one embodiment, include the time and date of the meeting, the topic of the meeting, and the location of the meeting. In FIG. 5E, various data elements of an e-mail notification are illustrated, and in one embodiment include the name of the sender, the subject line, and the date and time the e-mail was sent.

It can be seen that the various displays of FIGS. 5A–5E can provide the user of the wireless notification device 12 with useful information relating to various events which have occurred at the user's desk or computing station while the user was away.

Figure 6:
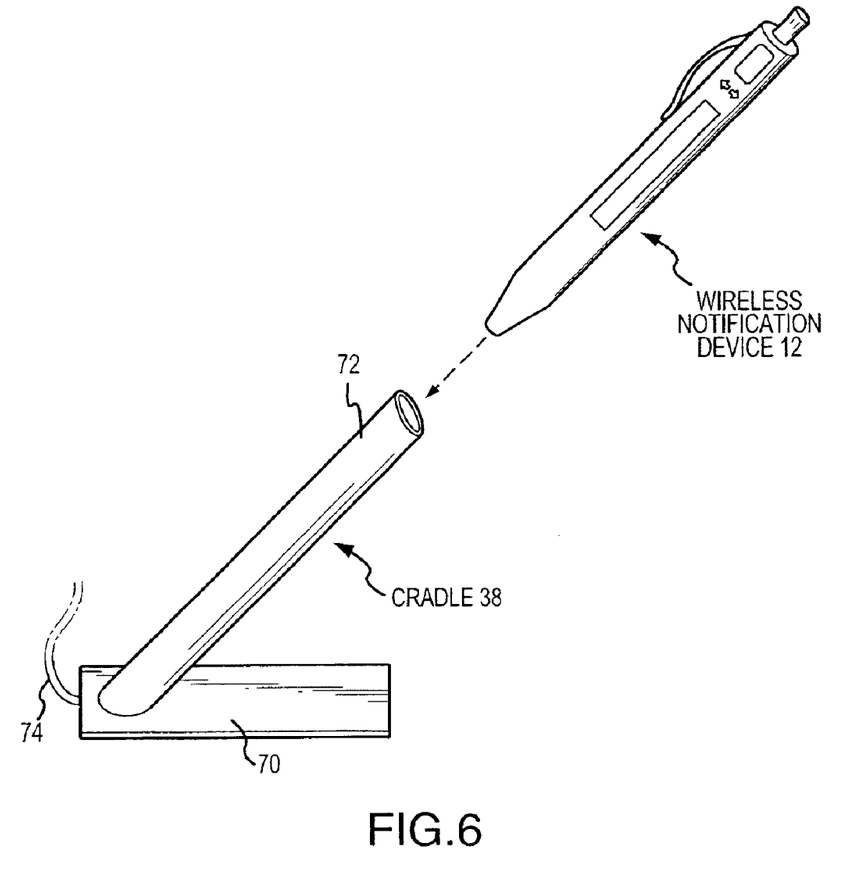
FIG. 6 illustrates an example of a cradle for receiving one example of a wireless notification device, in accordance with an embodiment of the present invention.

FIG. 6 illustrates one example of a notification device cradle 38, in accordance with one embodiment of the present invention. As shown in FIG. 6, the cradle 38 may include a base portion 70, and an enclosure portion 72 adapted to removably receive the wireless notification device 12 therein. The cradle 38 includes, in one embodiment, a battery charger 40 for charging the battery 54 of the wireless notification device 12 when the wireless notification device 12 is positioned in the cradle 38. The cradle 38 may also include, in one embodiment, the transmitter 42 which may be positioned in, on, or about the base postion 70 or the enclosure 72, or integrated therewith.

The cradle 38 may further include a cable 74 for providing the cradle 38 with power to recharge the rechargeable battery 54 of the wireless notification device 12, as well as to provide a signal line from the cradle 38 to the notification device interface software module 34e (FIG. 2) indicating whether the notification device 12 is in or out of the cradle 38. While FIG. 6 shows a cradle 38 which is a adapted to receive a wireless notification device 12 embodied as a writing device, it is understood that other cradle shapes could be used to receive wireless notification devices, or portions thereof, having different shapes or embodiments.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

The foregoing embodiments and examples are to be considered illustrative, rather than restrictive of the invention, and those modifications, which come within the meaning and range of equivalence of the claims, are to be included therein. While embodiments of the invention have been particularly shown and described, it will be understood by those skilled in the art that various other changes in the form and details may be made without departing from the spirit and scope of the invention.

We claim:

1. A system for notifying a user of one or more events relating to a computer of the user's, comprising:
    a notification device including a microprocessor, a display for displaying data, and a wireless receiver for receiving wireless data, the microprocessor coupled with the display and the wireless receiver; and
    a base station including wireless transmitter for transmitting data to the wireless receiver when an event has occurred at the computer of the user;
    wherein the base station includes a cradle for receiving at least a portion of the notification device, the cradle detecting whether the notification device is in the cradle, and
    wherein when the notification device is in cradle, the notification device enters an idle state.

2. The system of claim 1, wherein the event includes a receipt of a meeting reminder at the computer.

3. The system of claim 1, wherein the event includes a receipt of a calendar reminder at the computer.

4. The system of claim 1, wherein the event includes a receipt of an e-mail message at the computer.

5. The system of claim 1, wherein when the notification device is in the cradle, the base station transmits a message to the notification device when the base station detects that the event occurred.

6. The system of claim 5, wherein the message includes a unique code to identify the notification device as an intended recipient of the message.

7. The system of claim 1, wherein the notification device includes a rechargeable battery and the cradle includes a battery charger, so that when the notification device is in cradle, the base station recharges the notification device.

8. The system of claim 1, wherein the notification device includes a buffer for storing the data received from the base station.

9. The system of claim 1, wherein the notification device further comprises:
    at least one user selectable button for controlling the display of data.

10. The system of claim 1, wherein the notification device is integrated in the body of a pen.

11. The system of claim 1, wherein the notification device is integrated in the body of a pencil.

12. An apparatus for notifying a user of an occurrence of one or more events relating to the user's computer, comprising:
    a body;
    a wireless receiver for receiving a wireless message containing a notification corresponding to the occurrence of an event which occurred at the user's computer;
    a microprocessor positioned within the body, said microprocessor coupled with the wireless receiver so that the microprocessor receives the notification, wherein the microprocessor comprises a notification device interface module capable of receiving a signal indicating when the notification device is in or out of a cradle, wherein when the notification device is in the cradle, notification of events are not reported to the notification device; and
    a display positioned on said body and said display coupled with the microprocessor, said display displaying information relating to the notification.

13. The apparatus of claim 12, wherein the event includes a receipt of a meeting reminder at the computer.

14. The apparatus of claim 12, wherein the event includes a receipt of a calendar reminder at the computer.

15. The apparatus of claim 12, wherein the event includes a receipt of an e-mail message at the computer.

16. The apparatus of claim 12, further comprising:
    a memory having a portion configured as a queue for storing multiple notifications.

17. The apparatus of claim 12, further comprising:
    at least one user selectable button coupled with said microprocessor, said button for controlling the display of the information relating to the notification.

18. The apparatus of claim 12, wherein the body is elongated and generally cylindrical.

19. A method for notifying a user of an occurrence of an event relating to the user's computer, the method comprising:

providing a notification device including a microprocessor, a display for displaying data, and a wireless receiver for receiving data;

providing for detecting an event occurring at the user's computer;

transmitting a notification to the notification device, said notification corresponding to the event which has occurred at the computer of the user;

receiving the notification at the notification device;

displaying, on the display of the notification device, information relating to the notification;

providing a base station having a cradle for receiving the notification device; and determining when the notification device is positioned within the cradle, and if so, then disabling the detecting operation until a time when the notification device is not positioned within the cradle.

20. The method of claim 19, wherein the event detected includes a receipt of a meeting reminder at the user's computer.

21. The method of claim 19, wherein the event detected includes a receipt of a calendar reminder at the user's computer.

22. The method of claim 19, wherein the event detected includes a receipt of an e-mail message at the user's computer.

* * * * *